(12) United States Patent
Tomita

(10) Patent No.: US 9,676,354 B2
(45) Date of Patent: Jun. 13, 2017

(54) BUMPER ABSORBER STRUCTURE

(71) Applicant: TOYOTA JIDOSHA KABUSHIKI KAISHA, Toyota-shi, Aichi-ken (JP)

(72) Inventor: Yasuhiro Tomita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/996,611

(22) Filed: Jan. 15, 2016

(65) Prior Publication Data
US 2016/0264085 A1  Sep. 15, 2016

(30) Foreign Application Priority Data

Mar. 11, 2015 (JP) .................................. 2015-048764

(51) Int. Cl.
*B60R 19/00* (2006.01)
*B60R 19/48* (2006.01)
*B60R 19/52* (2006.01)
*B60R 19/18* (2006.01)

(52) U.S. Cl.
CPC .............. *B60R 19/48* (2013.01); *B60R 19/18* (2013.01); *B60R 19/52* (2013.01); *B60R 2019/1873* (2013.01); *B60R 2019/486* (2013.01); *B60R 2019/527* (2013.01)

(58) Field of Classification Search
CPC .......... B60R 19/48; B60R 19/52; B60R 19/18
USPC ......... 296/187.09, 193.1; 293/115; 180/68.1, 180/68.6
See application file for complete search history.

(56) References Cited

U.S. PATENT DOCUMENTS 8,919,470 B2 *  12/2014  Hori ..................... B60K 11/085
                                                             180/68.1
2013/0043692 A1  2/2013  Chiba et al.
2014/0291056 A1  10/2014  Takanaga et al.

FOREIGN PATENT DOCUMENTS

JP    2011-230592 A    11/2011
JP    2014-024465 A    2/2014
JP    2014-198506 A    10/2014

* cited by examiner

*Primary Examiner* — Joseph D Pape
(74) *Attorney, Agent, or Firm* — Oliff PLC

(57) ABSTRACT

A bumper absorber structure comprising a bumper reinforcement; a bumper cover that is equipped with an air intake opening; an air introduction path that is disposed on a rear side of the bumper cover and that introduces air from the air intake opening toward the vehicle rear side; a grille shutter that is disposed at the air introduction path and on a rear side of the bumper reinforcement and that opens and closes the air introduction path; and a bumper absorber that is attached to a front side of the bumper reinforcement, that is spaced apart from the bumper cover, that forms, together with the bumper reinforcement, a part of the air introduction path, and that has a front side surface on which is formed a raised portion that is in contact with or in close proximity to a back surface of the bumper cover.

6 Claims, 6 Drawing Sheets

BUMPER ABSORBER STRUCTURE

CROSS-REFERENCE TO RELATED APPLICATION

This application claims priority under 35 USC 119 from Japanese Patent Application No. 2015-048764 filed on Mar. 11, 2015, the disclosure of which is incorporated by reference herein.

BACKGROUND

Technical Field

Preferred embodiments relate to a bumper absorber structure.

Related Art

Japanese Patent Application Laid-open (JP-A) No. 2014-198506 discloses a grille shutter structure for a vehicle. Specifically, the grille shutter structure is equipped with a bumper cover that is disposed on the vehicle front side, an air intake opening that is formed in the bumper cover and opens toward the vehicle front side, an air introduction path that delivers air entering from the air intake opening to a power unit compartment, and a grille shutter that is disposed on a vehicle rear side of the air introduction path. A guide frame portion is disposed on an outer peripheral edge portion of the grille shutter, and a flexible seal member is disposed on a front end of the guide frame portion.

In a case where the grille shutter is closed, the flow of air in the air introduction path is cut off, the air remains stationary in the air introduction path, and the air flowing from the vehicle front side pushes against the air in the air introduction path, so the pressure in the air introduction path increases. When the pressure increases, the seal member becomes deformed and comes into contact with a wall portion of the air introduction path, so the gap between the guide frame portion and the air introduction path disappears. Because of this, the air does not flow out from the air introduction path, so more air is prevented by the stationary air from being introduced into the air introduction path. As a result, the air outside the vehicle does not enter the air intake opening but flows along a surface of the bumper cover toward the vehicle rear side, so a drop in aerodynamic performance is prevented.

However, in the case of the configuration disclosed in JP-A No. 2014-198506, the vehicle upper side of the air introduction path is configured to include the bumper cover, a bumper absorber that is covered by the bumper cover and that is disposed spaced apart from the bumper cover, and a bumper reinforcement that is disposed on the vehicle rear side of the bumper absorber. For this reason, when the grille shutter becomes closed and the pressure in the air introduction path increases, there is a possibility for the air to flow out through the gap between the bumper cover and the bumper absorber. Because of this, the air does not remain stationary in the air introduction path, so the air outside the vehicle does not flow along the surface of the bumper cover toward the vehicle rear side but enters the air intake opening, which creates resistance, and the aerodynamic performance may drop. For this reason, the prior art described above has room for improvement in this respect.

SUMMARY

In consideration of the problem described above, an object of preferred embodiments is to provide a bumper absorber structure that can improve the aerodynamic performance of a vehicle equipped with a grille shutter structure.

A bumper absorber structure of a first aspect of the disclosure includes a bumper reinforcement that is disposed at a front portion of a vehicle and that is formed in a long shape whose lengthwise direction coincides with a vehicle width direction; a bumper cover that covers the bumper reinforcement from a vehicle front side and that is equipped with an air intake opening that opens in a vehicle front and rear direction; an air introduction path that is disposed on a rear side in the vehicle front and rear direction of the bumper cover and that can introduce air from the air intake opening toward the vehicle rear side; a grille shutter that is disposed at the air introduction path and on a rear side in the vehicle front and rear direction of the bumper reinforcement and that opens and closes the air introduction path; and a bumper absorber that is attached to a front side in the vehicle front and rear direction of the bumper reinforcement, that is spaced apart from the bumper cover, that forms, together with the bumper reinforcement, a part of the air introduction path, and that has a front side surface on which is formed a raised portion that is in contact with or in close proximity to a back surface of the bumper cover.

A bumper absorber structure of a second aspect of the disclosure is, in the first aspect, that a deformation absorption space that allows deformation of the bumper cover at the time of a vehicle crash is disposed in a place outside the raised portion between the bumper absorber and the bumper cover.

A bumper absorber structure of a third aspect of the disclosure is, in the first aspect or the second aspect, that the raised portion is disposed with a deformation receiving portion that is formed in a shape meandering in the vehicle up and down direction on the front side surface of the bumper absorber as seen in a vehicle front view, and that receives deformation of the bumper cover toward the vehicle rear side.

A bumper absorber structure of a fourth aspect of the disclosure is, in any of the first aspect to the third aspect, that the raised portion is formed integrally with the bumper absorber.

A bumper absorber structure of a fifth aspect of the disclosure is, in any of the first aspect to the fourth aspect, that the raised portion is disposed in such a way as to make a complete circuit around, in a substantially rectangular shape, the front side surface of the bumper absorber as seen in a vehicle front view.

According to the bumper absorber structure of the first aspect, in a case where the air introduction path is opened by the grille shutter, air entering from the air intake opening disposed in the bumper cover travels in the air introduction path and flows toward the vehicle rear side. On the other hand, in a case where the air introduction path is closed by the grille shutter, the air entering from the air intake opening does not flow toward the vehicle rear side but stays in the air introduction path. That is to say, the air remains stationary in the air introduction path and following air does not enter. In this state, air flow flowing from the vehicle front side pushes against the air remaining stationary in the air introduction path, so the pressure in the air introduction path increases, and the air enters between the bumper cover and the bumper absorber that is spaced apart from the bumper cover. However, because the raised portion that is in contact with or in close proximity to the back surface of the bumper cover is formed on the bumper absorber, the raised portion creates resistance and can prevent the air from flowing out from between the bumper cover and the bumper absorber. As a result, the air can remain stationary in the air introduction path, so following air is prevented by the stationary air from entering the air introduction path. Consequently, the air outside the vehicle can be caused to flow along the surface of the bumper cover toward the vehicle rear side.

According to the bumper absorber structure of the second aspect, at the time of a collision with a pedestrian, legs of the pedestrian and the bumper cover collide with each other, so the bumper cover becomes deformed in such a way that it becomes displaced toward the vehicle rear side. At this time, deformation of the bumper cover is allowed because there is the deformation absorption space in a place outside the raised portion between the bumper cover and the bumper absorber, so it is easier for the bumper cover to become deformed. The crash load is absorbed by this deformation, so the crash load received by the legs of the pedestrian can be reduced.

According to the bumper absorber structure of the third aspect, the raised portion is disposed with the deformation receiving portion that is formed in a shape meandering in the vehicle up and down direction on the front side surface of the bumper absorber as seen in a vehicle front view, so an area of the raised portion which is in contact with or in close proximity to the back surface of the bumper cover becomes wider. Consequently, when a load is applied by hand from the vehicle outer side to the bumper cover such as when washing the vehicle, this load can be received in a wide area via the bumper absorber by the bumper reinforcement, so deformation of the bumper cover toward the vehicle rear side can be prevented.

According to the bumper absorber structure of the fourth aspect, the raised portion is formed integrally with the bumper absorber, so it is not necessary to prepare the raised portion using a separate part. Furthermore, a post-processing step for disposing the raised portion becomes unnecessary.

According to the bumper absorber structure of the fifth aspect, the raised portion is disposed in such a way as to make a complete circuit around, in a substantially rectangular shape, the front side surface of the bumper absorber as seen in a vehicle front view, so the raised portion has two sections in contact with or in close proximity to the back surface of the bumper cover and disposed spaced apart from each other in the vehicle up and down direction. Consequently, the air can be more reliably prevented from flowing out from between the bumper cover and the bumper absorber.

The bumper absorber structure of the first aspect has the superior effect that it can prevent a drop in the aerodynamic performance of a vehicle equipped with a grille shutter structure.

The bumper absorber structure of the second aspect has the superior effect that it can provide pedestrian protection performance.

The bumper absorber structure of the third aspect has the superior effect that excellent appearance of the bumper cover is maintained.

The bumper absorber structure of the fourth aspect has the superior effect that it can reduce costs and improve the aerodynamic performance of a vehicle equipped with a grille shutter structure.

The bumper absorber structure of the fifth aspect has the superior effect that it can further prevent a drop in the aerodynamic performance of a vehicle equipped with a grille shutter structure.

BRIEF DESCRIPTION OF THE DRAWINGS

Embodiments of the present invention will be described in detail based on the following figures, wherein.

DETAILED DESCRIPTION (First Embodiment)

A first embodiment of a bumper absorber structure pertaining to the present invention will be described below using FIG. 1 to FIG. 4. It should be noted that arrow FR shown in these drawings indicates a forward direction in a vehicle front and rear direction, arrow OUT indicates an outward direction in a vehicle width direction, and arrow UP indicates an upward direction in a vehicle up and down direction.

Figure 1:
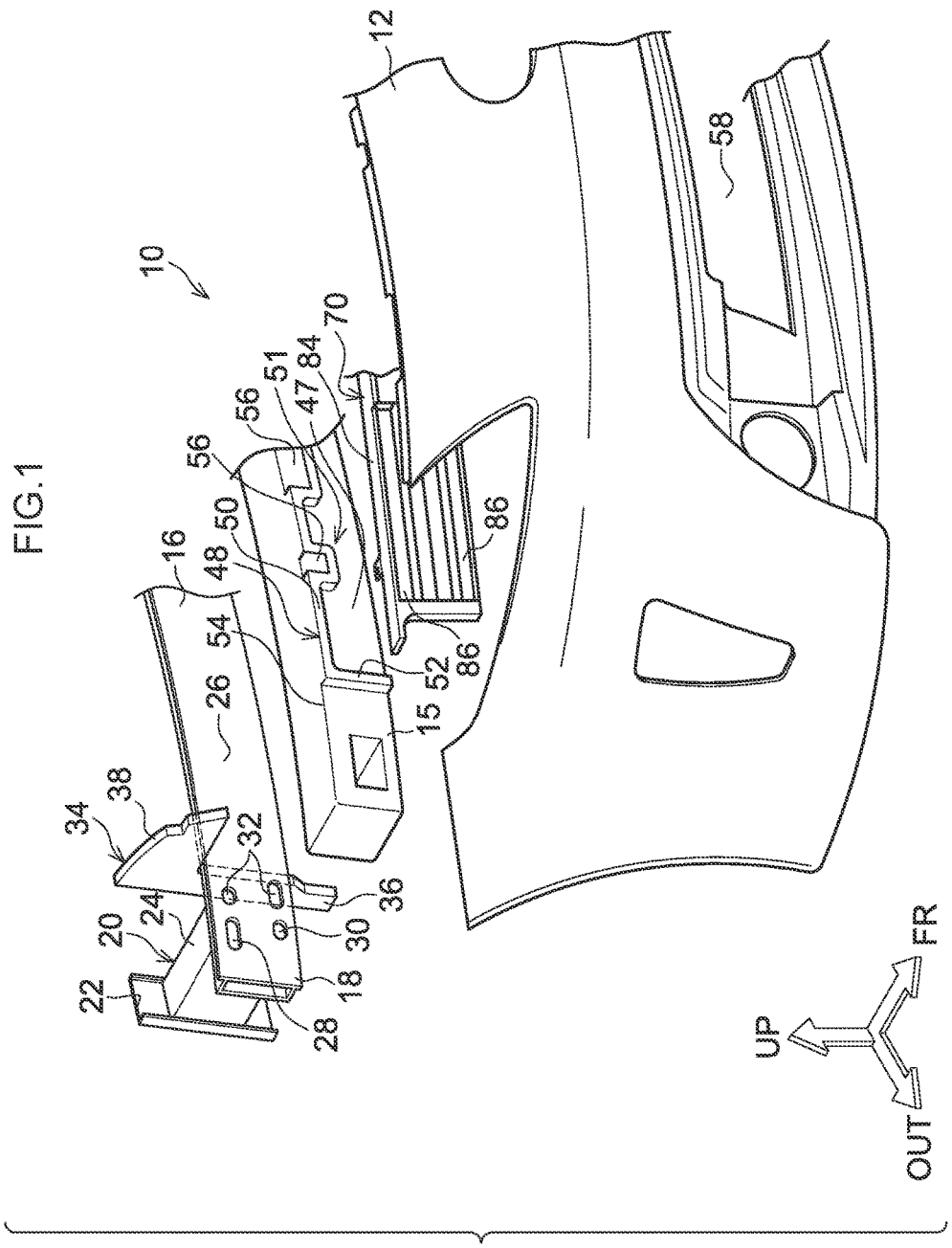
FIG. 1 is an exploded perspective view showing a vehicle front portion equipped with a bumper absorber structure pertaining to a first embodiment of the present invention.

As shown in FIG. 1 a vehicle front portion of a vehicle 10 is configured to include a front bumper cover 12, a front bumper absorber 14, and a front bumper reinforcement 16.

The front bumper reinforcement 16 is made of aluminum alloy and is formed in a long shape disposed extending along a substantially vehicle width direction. The cross-sectional shape of the front bumper reinforcement 16 orthogonal to the vehicle width direction is a substantially rectangular shape whose lengthwise direction coincides with the vehicle up and down direction.

A pair of right and left crash boxes 20 attached to front end portions of non-illustrated front side members are disposed in the neighborhoods of both vehicle width direction, that is to say, both lengthwise direction end portions 18 of the front bumper reinforcement 16. Each of the crash boxes 20 is configured by a base end bracket 22 and a projecting portion 24 that projects from the base end bracket 22 toward the vehicle front portion. The base end bracket 22 is attached to the front end portion of the front side member by a non-illustrated fastener. The cross-sectional shape of the projecting portion 24 orthogonal to the vehicle front and rear direction is a substantially rectangular shape. A front end portion of the projecting portion 24 is fastened by a non-illustrated fastener to a vehicle rear side surface 40 (see FIG. 3) of the front bumper reinforcement 16. Because of this, the front bumper reinforcement 16 is secured via the crash box 20 to the front side member.

A first engagement hole 28 and a second engagement hole 30 are formed in the neighborhoods of the both end portions 18 on a vehicle front side surface 26 of the front bumper reinforcement 16. The first engagement hole 28 and the second engagement hole 30 are formed through the surface 26 in the plate thickness direction thereof The first engagement hole 28 and the second engagement hole 30 are formed in positions corresponding to fasteners that connect the vehicle front end portion of the projecting portion 24 of the crash box 20 and the surface 26 to each other. Consequently, by inserting a tool through the first engagement hole 28 and the second engagement hole 30 and fastening the fasteners, the front bumper reinforcement 16 and the crash box 20 can be fastened to each other. It should be noted that through holes 32 for fastening fasteners of the crash box 20 in the same way as the first engagement hole 28 and the second engagement hole 30 are formed in the surface 26 on the vehicle width direction inner side of the first engagement hole 28 and the second engagement hole 30.

Figure 3:
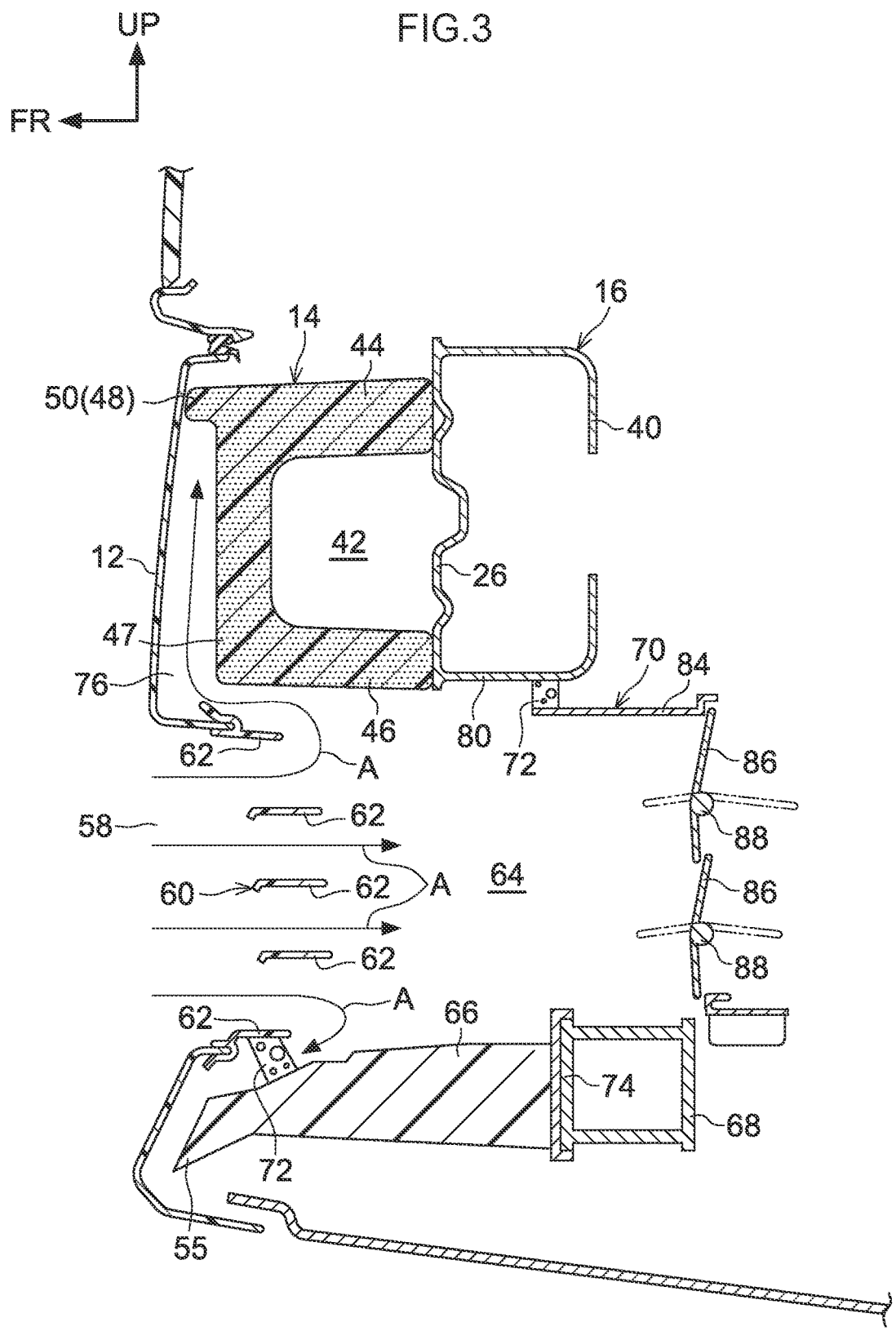
FIG. 3 is an enlarged sectional view showing a state in which the vehicle front portion equipped with the bumper absorber structure pertaining to the first embodiment has been cut along the vehicle up and down direction at substantially vehicle width direction center of the bumper absorber structure.

The front bumper absorber 14 is disposed on the vehicle front side of the front bumper reinforcement 16. The front bumper absorber 14 is formed in a long shape along the lengthwise direction of the front bumper reinforcement 16. Furthermore, the front bumper absorber 14 is configured by a foam material such as resin and has a predetermined hardness. At the time of a collision with an impactor, the front bumper absorber 14 becomes compressively deformed in the vehicle front and rear direction and performs predetermined energy absorption. Specifically, as shown in FIG. 3, the front bumper absorber 14 has a hollowed-out portion 42 that is disposed in the vehicle up and down direction substantially center portion of the front bumper absorber 14 and opens toward the vehicle rear side. Furthermore, the front bumper absorber 14 has an upper leg 44, which is provided on the vehicle upper side of the hollowed-out portion 42 and extends toward the vehicle rear side as seen in a vehicle side sectional view, and a lower leg 46, which is provided on the vehicle lower side of the hollowed-out portion 42 and extends toward the vehicle rear side as seen in a vehicle side sectional view. Because of this, the cross-sectional shape of the front bumper absorber 14 orthogonal to the vehicle width direction is formed in a substantially U-shape including the upper leg 44 configuring the vehicle upper side relative to the hollowed-out portion 42 and the lower leg 46 configuring the vehicle lower side relative to the hollowed-out portion 42. The hollowed-out portion 42 functions as a weak portion so that the compressive deformation of the front bumper absorber 14 in the vehicle front and rear direction is promoted.

Figure 4:
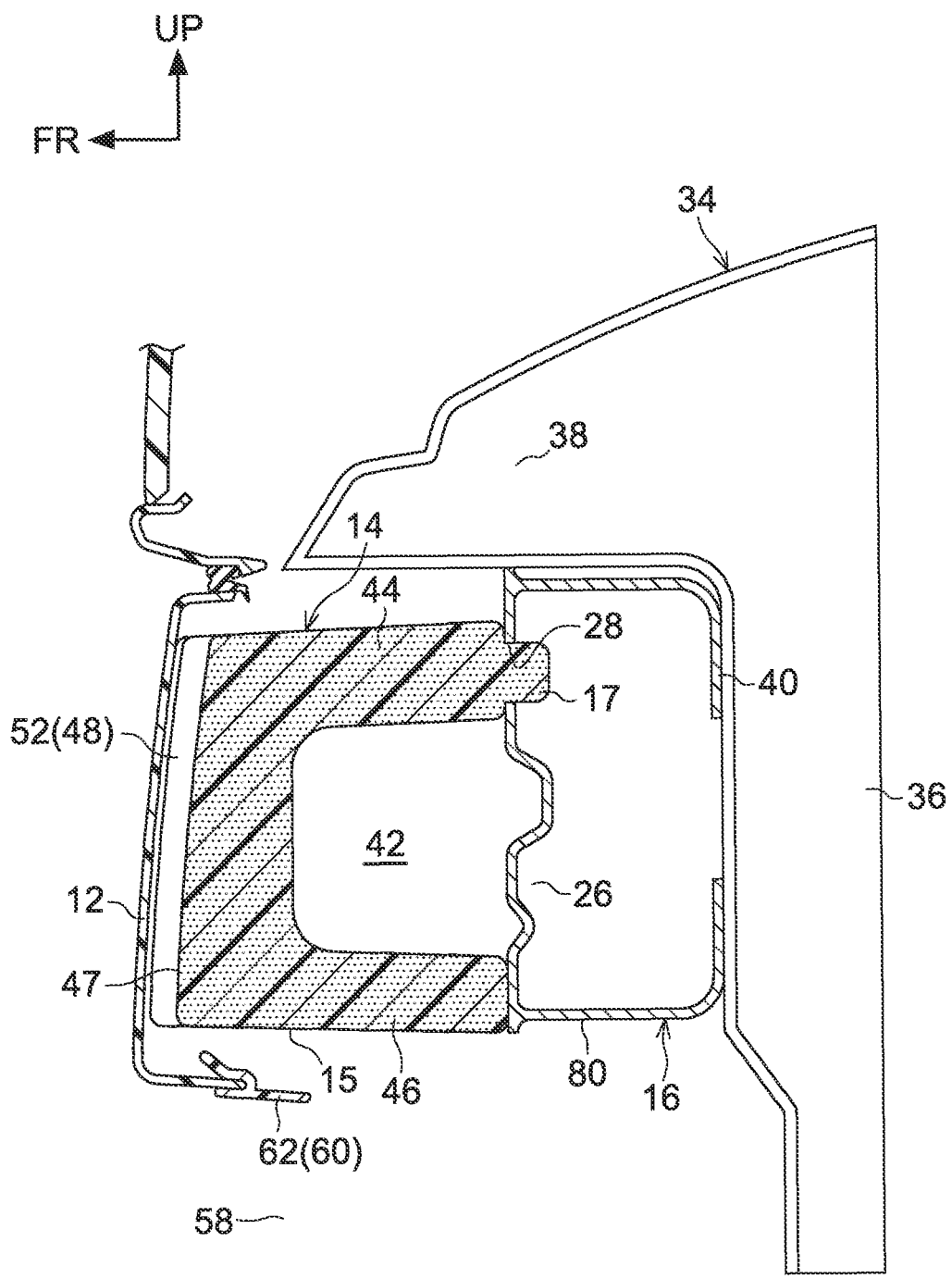
FIG. 4 is an enlarged sectional view showing a state in which the vehicle front portion equipped with the bumper absorber structure pertaining to the first embodiment has been cut along the vehicle up and down direction at substantially vehicle width direction outer side of the bumper absorber structure.

As shown in FIG. 4, an engagement portion 17 is formed at the front bumper absorber 14 in the neighborhoods of both vehicle width direction end portions 15 thereof and on the vehicle rear side of the upper leg 44. The engagement portion 17 is disposed on the vehicle upper side of the hollowed-out portion 42 and in a position corresponding to the first engagement hole 28 disposed in the front bumper reinforcement 16. The engagement portion 17 is formed projecting toward the vehicle rear side relative to the upper leg 44. The vehicle up and down direction dimension of the engagement portion 17 is substantially the same as the vehicle up and down direction dimension of the first engagement hole 28. Furthermore, the vehicle width direction dimension of the engagement portion 17 is substantially the same as the vehicle width direction dimension of the first engagement hole 28. The engagement portion 17 is press-fitted into the first engagement hole 28.

A deflector 34 is disposed on the vehicle rear side of the front bumper reinforcement 16. The deflector 34 is formed in a substantially inverted L-shaped plate as seen in a vehicle side view and has s vehicle up and down extension portion 36 and a vehicle front and rear extension portion 38. Furthermore, the deflector 34 is placed in such a way that the vehicle up and down extension portion 36 is positioned on the vehicle rear side surface 40 of the front bumper reinforcement 16 and the vehicle front and rear extension portion 38 is positioned on the vehicle upper side of the front bumper reinforcement 16. It should be noted that, the deflector 34 is disposed on the respective end portions in the vehicle width direction of the front bumper reinforcement 16.

Figure 2:
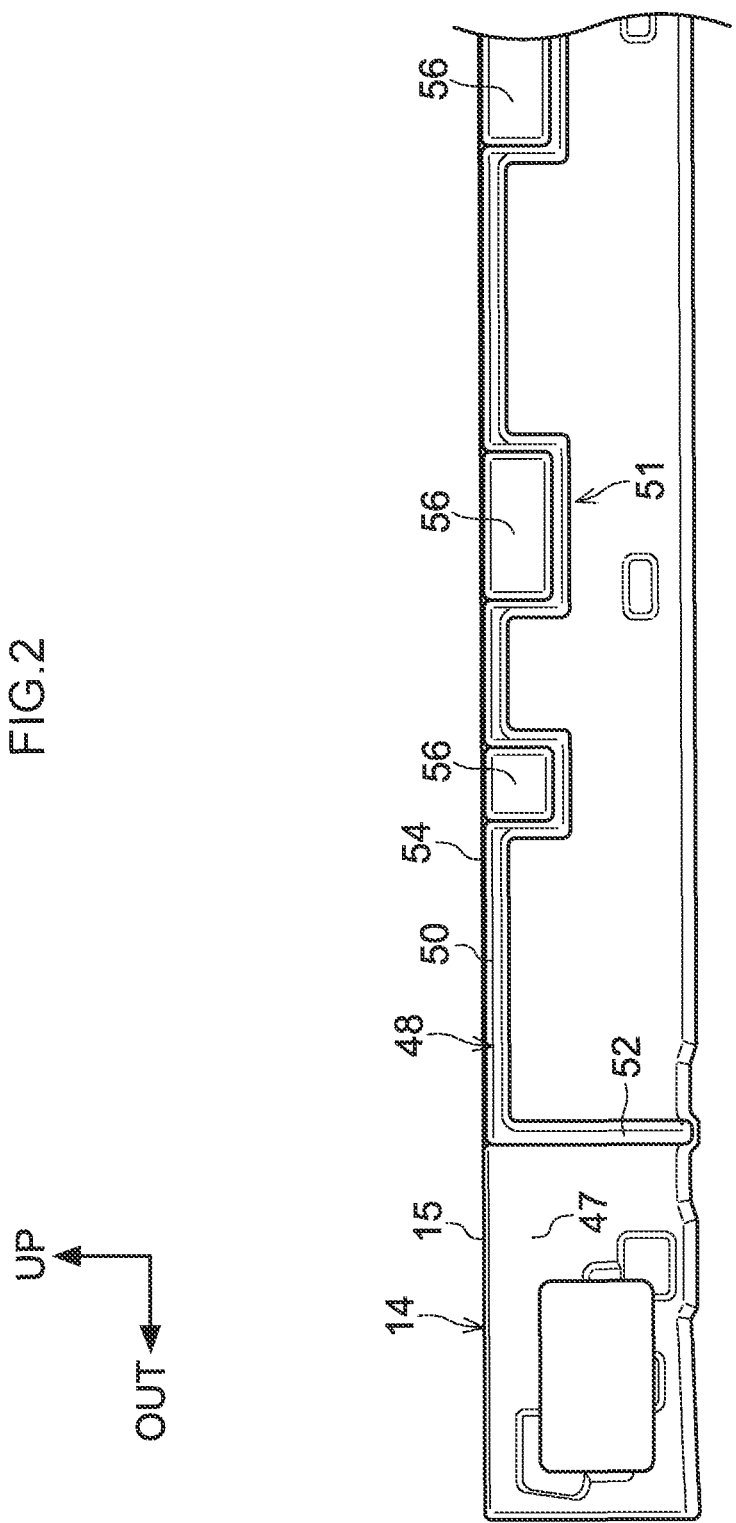
FIG. 2 is a front view showing a bumper absorber equipped with the bumper absorber structure pertaining to the first embodiment.

As shown in FIG. 2, a raised portion 48 is formed on a vehicle front side surface 47 of the front bumper absorber 14. The raised portion 48 is formed integrally with the front bumper absorber 14, is configured by an upper side raised portion 50 disposed extending along the substantially vehicle width direction and lateral side raised portions 52 disposed extending along the substantially vehicle up and down direction. The raised portion 48 projects toward the vehicle front side relative to the vehicle front side surface 47. That is to say, part of the vehicle front side surface 47 projects toward the vehicle front side.

The upper side raised portion 50 is disposed extending along a vehicle upper side end portion 54 of the vehicle front side surface 47 of the front bumper absorber 14. Furthermore, a deformation receiving portion 51 is formed at the upper side raised portion 50. Specifically, plural bracket avoidance portions 56 are formed in the vehicle upper side end portion 54 of the vehicle front side surface 47. The bracket avoidance portions 56 are formed in a recessed shape toward the vehicle rear side so as to avoid interference with a non-illustrated license plate bracket attached to the back surface of the later-described front bumper cover 12. The deformation receiving portion 51 is disposed along the vehicle width direction outer sides and the vehicle lower sides of the bracket avoidance portions 56 so as to bypass the bracket avoidance portions 56. That is to say, the deformation receiving portion 51 has a shape that meanders in the vehicle up and down direction as seen in a vehicle front view.

The lateral side raised portions 52 are disposed extending along the vehicle up and down direction in positions at the vehicle front side surface 47 of the front bumper absorber 14, which positions correspond to the vehicle front and rear extension portions 38 of the deflectors 34 (see FIG. 4). Additionally, the lateral side raised portions 52 are formed such that there are two of them spaced apart from each other in the vehicle width direction of the front bumper absorber 14 in correspondence to the deflectors 34. The lateral side raised portions 52 are integrally connected to the upper side raised portion 50 on their upper sides. Consequently, the raised portion 48 is formed in a substantially inverted U-shape that opens toward the vehicle lower side as seen in a vehicle front view.

As shown in FIG. 1, the front bumper cover 12 is disposed on the vehicle front side of the front bumper absorber 14. The front bumper cover 12 forms part of the exterior shape of the vehicle body and covers the front bumper absorber 14 and the front bumper reinforcement 16 from the vehicle front side. Furthermore, the front bumper cover 12 is formed of resin in a thin wall, and when an impact load acts on the front bumper cover 12 due to a collision with a pedestrian, for example, the front bumper cover 12 becomes deformed or broken and allows the impact load to act on the front bumper absorber 14.

An air intake opening 58 that opens in the vehicle front and rear direction is formed in the vehicle up and down direction lower side of the front bumper cover 12. The air intake opening 58 is formed in a substantially rectangular shape whose lengthwise direction coincides with the vehicle width direction as seen in a front view and is placed in such a way that the vehicle width direction center of the air intake opening 58 coincides with the vehicle width direction center of the front bumper cover 12.

As shown in FIG. 3, a lower grille 60 is attached to the air intake opening 58 in the front bumper cover 12. The lower grille 60 is equipped with plural grille fins 62 that are disposed extending in the vehicle width direction and spaced apart from each other in the vehicle up and down direction. Because of this, air (A) introduced from the air intake opening 58 is guided toward the substantially vehicle rear side.

An air introduction path 64 is formed on the vehicle rear side of the front bumper cover 12 and on the vehicle rear side of the air intake opening 58. The air introduction path 64 is a space disposed extending in the vehicle front and rear direction and surrounded by a lower absorber 66, a second cross member 68, the front bumper absorber 14, the front bumper reinforcement 16, a grille shutter 70, and the deflectors 34.

The vehicle lower side of the air introduction path 64 is configured by, and in the order of, the front bumper cover 12, the lower absorber 66, and the second cross member 68 from the vehicle front side. The lower absorber 66 is formed in a substantially rectangular shape whose lengthwise direction coincides with the substantially vehicle width direction as seen in a vehicle plan view. Furthermore, a vehicle front end portion 55 of the lower absorber 66 is positioned on the vehicle lower side of the air intake opening 58 and on further vehicle front side than the raised portion 48 of the front bumper absorber 14 in the vehicle side view. It should be noted that a seal member 72 is elastically sandwiched and held between the lower absorber 66 and the front bumper cover 12. The seal member 72 is configured by a flexible material and prevents the air (A) from entering between the lower absorber 66 and the front bumper cover 12.

The second cross member 68 is disposed on the vehicle rear side of the lower absorber 66. The second cross member 68 is disposed extending in the vehicle width direction, and the cross-sectional shape of the second cross member 68 orthogonal to the vehicle width direction is a substantially rectangular shape. Additionally, the lower absorber 66 is attached to a vehicle front side wall portion 74 of the second cross member 68.

The vehicle upper side of the air introduction path 64 is configured by, and in the order of, the front bumper cover 12, the front bumper absorber 14, the front bumper reinforcement 16, and the grille shutter 70 from the vehicle front side. A deformation absorption space 76 is disposed between the front bumper absorber 14 and the front bumper cover 12. The deformation absorption space 76 is a space by which the back surface of the front bumper cover 12 and the vehicle front side surface 47 of the front bumper absorber 14 are spaced apart from each other so as to allow deformation of the front bumper cover 12 at the time of a vehicle crash.

Furthermore, the raised portion 48 of the front bumper absorber 14 is placed in close proximity to the back surface of the front bumper cover 12. It should be noted that it is preferred that the raised portion 48 be in contact with the back surface of the front bumper cover 12, but in consideration of variations during assembly the raised portion 48 may also be in close proximity to the back surface of the front bumper cover 12.

The front bumper absorber 14 is in contact with and attached to a vehicle front side wall portion 78 of the front bumper reinforcement 16 using the engagement portion 17. That is, the bumper absorber structure is given a configuration in which there is no gap between the front bumper absorber 14 and the front bumper reinforcement 16.

The grille shutter 70 is disposed via a seal member 72 at a vehicle lower side wall portion 80 of the front bumper reinforcement 16. The grille shutter 70 is configured to include a frame 84 and plural shutters 86 formed in a plate shape. The shutters 86 can be rotated by a non-illustrated drive device about shaft portions 88 attached to the frame 84. Consequently, when the shutters 86 are rotated in such a way as to lie along the substantially horizontal direction, the grille shutter 70 becomes opened and the air (A) can be introduced into a non-illustrated power unit compartment disposed on the vehicle rear side of the grille shutter 70. On the other hand, when the shutters 86 are rotated in such a way as to lie along the substantially vertical direction, the grille shutter 70 becomes closed and the introduction of the air (A) into the power unit compartment is cut off.

Although it is not illustrated in the drawings, the vehicle width direction outer sides of the air introduction path 64 are configured by the frame 84 of the grille shutter 70 and the vehicle up and down extension portions 36 of the deflectors 34 disposed on the vehicle rear side of the frame 84.

(Action and Effects of First Embodiment)

The action and effects of the present embodiment will be described using a comparing example shown in FIG. 5.

Figure 5:
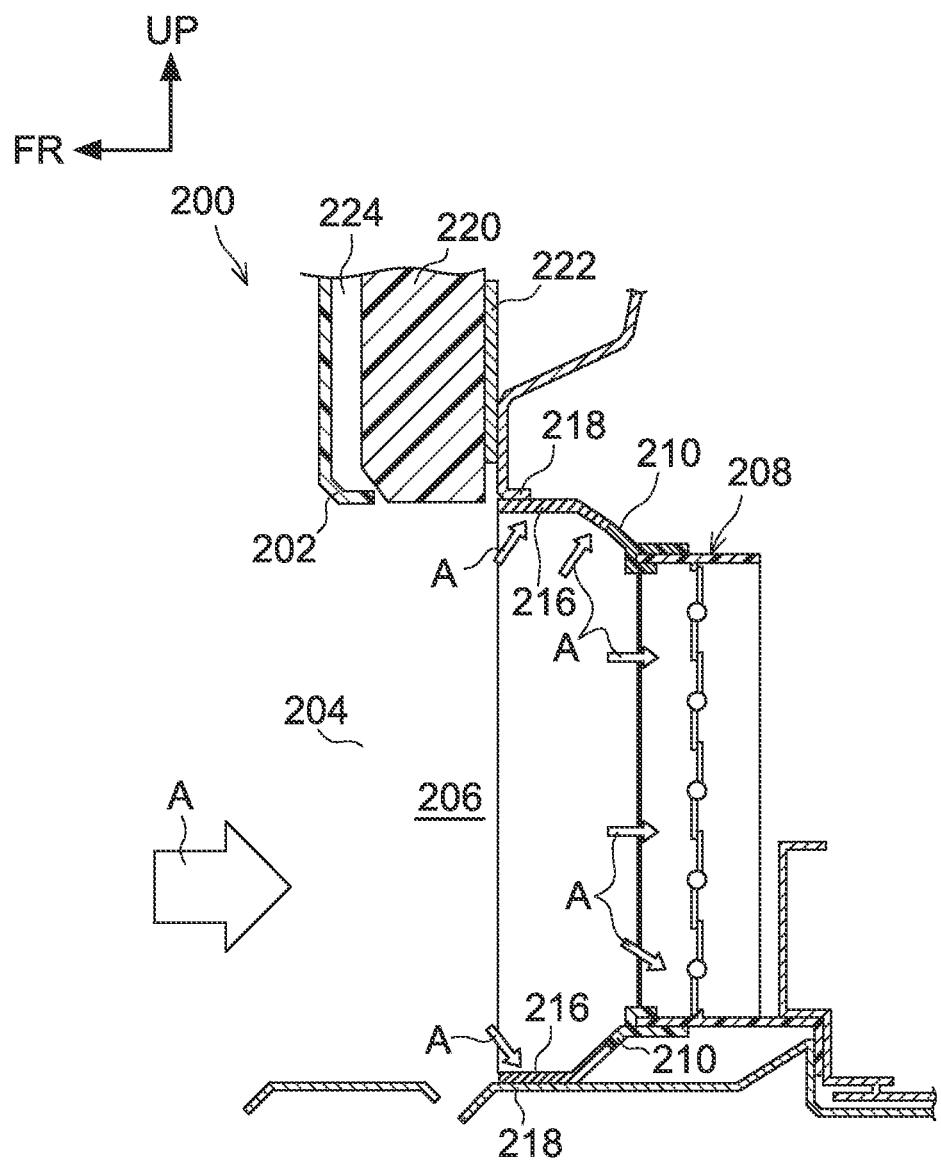
FIG. 5 is an enlarged sectional view showing a state in which a substantially vehicle width direction center portion of a vehicle front portion equipped with a bumper absorber structure pertaining to a comparing example has been cut along the vehicle up and down direction.

As shown in FIG. 5, a vehicle front portion of a vehicle 200 has a front bumper cover 202, an air intake opening 204 that is formed in the front bumper cover 202 and opens toward the vehicle front side, an air introduction path 206 that delivers the air (A) entering from the air intake opening 204 to a power unit compartment, and a grille shutter 208 that is disposed on the vehicle rear side of the air introduction opening 206. A guide frame portion 210 is disposed on the outer peripheral edge portion of the grille shutter 208, and a flexible seal member 216 is disposed on the front end of the guide frame portion 210. In a case where the grille shutter 208 is closed, the flow of air (A) in the air introduction path 206 is cut off by the grille shutter 208, the air (A) remains stationary in the air introduction path 206, and following air (A) flowing from the vehicle front side pushes against the air (A) in the air introduction path 206, so the pressure in the air introduction path 206 increases. When the pressure increases, the seal member 216 becomes deformed and comes into contact with a wall portion 218 of the air introduction path 206. Because of this, the gap between the guide frame portion 210 and the air introduction path 206 disappears. As a result, the air (A) does not flow out from the air introduction path 206, so more of the air (A) is prevented by the stationary air (A) from being introduced into the air introduction path 206. Consequently, the air (A) outside the vehicle does not enter the air intake opening 204 but flows along the surface of the front bumper cover 202 toward the vehicle rear side, so a drop in aerodynamic performance is prevented.

However, according to this comparing example, the vehicle upper side of the air introduction path 206 is configured by the front bumper cover 202, a front bumper absorber 220 that is covered by the front bumper cover 202 and is disposed spaced apart from the front bumper cover 202, and a front bumper reinforcement 222 that is disposed on the vehicle rear side of the front bumper absorber 220. A gap 224 is formed between the front bumper cover 202 and the front bumper absorber 220. For this reason, when the grille shutter 208 becomes closed and the pressure in the air introduction path 206 increases, there is the possibility for the air (A) to flow out through the gap 224 between the front bumper cover 202 and the front bumper absorber 220. Because of this, the air (A) does not remain stationary in the air introduction path 206, so the air (A) outside the vehicle does not flow along the surface of the front bumper cover 202 toward the vehicle rear side but enters the air intake opening 204, which creates resistance, and there is the potential for the aerodynamic performance to drop.

In contrast, in the present embodiment, as shown in FIG. 3, in a case where the air introduction path 64 is opened by the grille shutter 70, the air (A) entering from the air intake opening 58 travels in the air introduction path 64 and flows toward the vehicle rear side. On the other hand, in a case where the air introduction path 64 is closed by the grille shutter 70, the air (A) entering from the air intake opening 58 does not flow toward the vehicle rear side but stays in the air introduction path 64. That is to say, the air (A) remains stationary in the air introduction path 64, and following air (A) does not enter the air introduction path 64. In this state, the air (A) flowing from the vehicle front side pushes against the air (A) remaining stationary in the air introduction path 64, so the pressure in the air introduction path 64 increases, and the air (A) enters between the front bumper cover 12 and the front bumper absorber 14 that is spaced apart from the front bumper cover 12. However, because the raised portion 48 formed on the front bumper absorber 14 is in contact with or in close proximity to the back surface of the front bumper cover 12, the raised portion 48 creates resistance and can prevent the air (A) from flowing out from between the front bumper cover 12 and the front bumper absorber 14. As a result, the air (A) can remain stationary in the air introduction path 64, so following air (A) is prevented by the stationary air A from entering the air introduction path 64. Consequently, the air (A) outside the vehicle can be caused to flow along the surface of the front bumper cover 12 toward the vehicle rear side. Because of this, a drop in the aerodynamic performance of the vehicle 10 can be prevented.

Furthermore, at the time of a collision with a pedestrian, the legs of the pedestrian and the front bumper cover 12 collide with each other, so the front bumper cover 12 becomes deformed in such a way that it becomes displaced toward the vehicle rear side. At this time, deformation of the front bumper cover 12 is allowed because there is the deformation absorption space 76 in a place outside the raised portion 48 between the front bumper cover 12 and the front bumper absorber 14. Accordingly, it is easier for the front bumper cover 12 to become deformed. The crash load is absorbed by this deformation, so the crash load received by the legs of the pedestrian can be reduced. Because of this, pedestrian protection performance can be provided.

Moreover, the upper side raised portion 50 is disposed with the deformation receiving portion 51 that is formed in a shape meandering in the vehicle up and down direction on the vehicle front side surface 47 of the front bumper absorber 14 as seen in a vehicle front view, so the area in which the back surface of the front bumper cover 12 and the raised portion 48 are in contact with or in close proximity to each other becomes wider. Consequently, when a load is applied by hand from the vehicle outer side to the front bumper cover 12 such as when washing the vehicle, this load can be received in a wide area via the front bumper absorber 14 by the front bumper reinforcement 16, so deformation of the front bumper cover 12 toward the vehicle rear side can be prevented. Because of this, good appearance of the front bumper cover 12 can be maintained.

Furthermore, the raised portion 48 is formed integrally with the front bumper absorber 14, so it is not necessary to prepare the raised portion 48 using a separate part. Furthermore, a post-processing step for disposing the raised portion 48 becomes unnecessary. Because of this, costs can be reduced and the aerodynamic performance of the vehicle 10 equipped with the grille shutter structure can be improved.

Furthermore, the vehicle front end portion 55 of the lower absorber 66 is positioned on the vehicle lower side of the air intake opening 58 in the front bumper cover 12 and on further vehicle front side than the raised portion 48 of the front bumper absorber 14 in the vehicle side view. Consequently, at the time of a collision with a pedestrian, the lower absorber 66 disposed on the vehicle lower side relative to the front bumper absorber 14 contacts the legs of the pedestrian before the front bumper absorber 14, that is placed in a position close to the center of gravity of the legs of the pedestrian as a result of being disposed on the vehicle upper side. That is, the pedestrian can be flipped up because the lower absorber 66 first contacts the lower sides of the legs that are in positions far from the center of gravity of the legs of the pedestrian. Because of this, the localized reaction force input to the legs of the pedestrian can be reduced, so pedestrian protection performance can be enhanced.

(Second Embodiment)

Next, a second embodiment of the bumper absorber structure pertaining to the present invention will be described using FIG. 6. It should be noted that the same numbers are assigned to constituent parts that are the same as those in the first embodiment, and description of those same constituent parts will be omitted.

The bumper absorber structure pertaining to the second embodiment has the same basic configuration as that of the first embodiment but is characterized in that a raised portion 92 of a front bumper absorber 90 is disposed in such a way as to make a complete circuit around, in a substantially rectangular shape, a vehicle front side surface 94 of the front bumper absorber 90.

Figure 6:
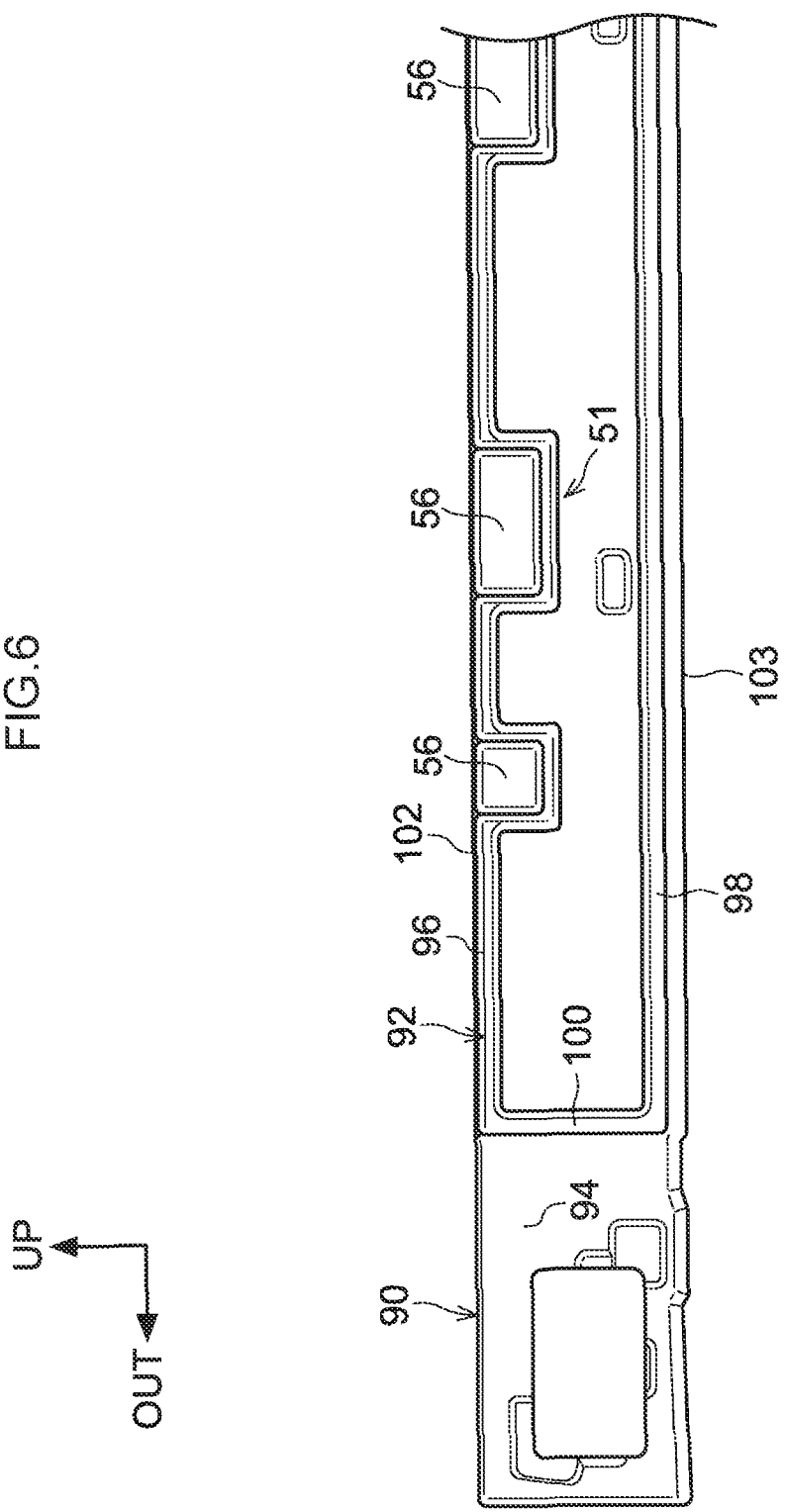
FIG. 6 is a front view showing a bumper absorber equipped with a bumper absorber structure pertaining to a second embodiment of the present invention.

That is, as shown in FIG. 6, the raised portion 92 is formed on the vehicle front side surface 94 of the front bumper absorber 90. The raised portion 92 is formed integrally with the front bumper absorber 90. Furthermore, the raised portion 90 is configured by an upper side raised portion 96 and a lower side raised portion 98, which are disposed extending along the substantially vehicle width direction, and two lateral side raised portions 100, which are disposed extending along the substantially vehicle up and down direction. The raised portion 92 projects toward the vehicle front side relative to the vehicle front side surface 94. Additionally, the raised portion 92 is placed in close proximity to the back surface of the front bumper cover 12.

The upper side raised portion 96 is disposed extending along a vehicle upper side end portion 102 of the vehicle front side surface 94 of the front bumper absorber 90. Furthermore, a deformation receiving portion 51 is formed on the upper side raised portion 96.

The lower side raised portion 98 is disposed extending in the vehicle width direction along a vehicle lower side end portion 103 of the vehicle front side surface 94 of the front bumper absorber 90. That is to say, the raised portion 92 has two sections in close proximity to the back surface of the front bumper cover 12 and disposed spaced apart from each other in the vehicle up and down direction.

The lateral side raised portions 100 are disposed extending along the vehicle up and down direction in positions on the vehicle front side surface 94 of the front bumper absorber 90 corresponding to the vehicle front and rear extension portions 38 of the deflectors 34. Additionally, the lateral side raised portions 100 are formed such that there are two of them spaced apart from each other in the vehicle width direction of the front bumper absorber 14 in correspondence to the deflectors 34. The lateral side raised portions 100 are integrally connected to the upper side raised portion 96 on their vehicle upper sides and are integrally connected to the lower side raised portion 98 on their vehicle lower sides. Consequently, the raised portion 92 is formed continuously in a substantially rectangular shape as seen in a vehicle front view.

(Action and Effects of Second Embodiment)

Next, the action and effects of the present embodiment will be described.

In the present embodiment, like in the first embodiment, in a case where the air introduction path 64 is opened by the grille shutter 70, the air (A) entering from the air intake opening 58 disposed in the front bumper cover 12 travels in the air introduction path 64 and flows toward the vehicle rear side. On the other hand, in a case where the air introduction path 64 is closed by the grille shutter 70, the air (A) entering from the air intake opening 58 does not flow toward the vehicle rear side but stays in the air introduction path 64. That is to say, the air (A) remains stationary in the air introduction path 64, and following air (A) does not enter the air introduction path 64. In this state, the air (A) flowing from the vehicle front side pushes the air (A) remaining stationary in the air introduction path 64, so the pressure in the air introduction path 64 increases, and the air (A) enters between the front bumper cover 12 and the front bumper absorber 90 that is spaced apart from the front bumper cover 12. However, because the raised portion 92 that is in contact with or in close proximity to the back surface of the front bumper cover 12 is formed on the front bumper absorber 90, the raised portion 92 creates resistance and can prevent the air (A) from flowing out from between the front bumper cover 12 and the front bumper absorber 90. As a result, the air (A) can remain stationary in the air introduction path 64, so following air (A) is prevented by the stationary air (A) from entering the air introduction path 64. Consequently, the air outside the vehicle can be caused to flow along the surface of the front bumper cover 12 toward the vehicle rear side. Because of this, a drop in the aerodynamic performance of the vehicle 10 can be prevented.

Furthermore, at the time of a collision with a pedestrian, the legs of the pedestrian and the front bumper cover 12 collide with each other, so the front bumper cover 12 becomes deformed in such a way that it becomes displaced toward the vehicle rear side. At this time, deformation of the front bumper cover 12 is allowed because there is the deformation absorption space 76 in a place outside the raised portion 92 between the front bumper cover 12 and the front bumper absorber 90, so it is easier for the front bumper cover 12 to become deformed. The crash load is absorbed by this deformation, so the crash load received by the legs of the pedestrian can be reduced. Because of this, pedestrian protection performance can be provided.

Moreover, the raised portion 92 is disposed with the deformation receiving portion 51 that is formed in a shape meandering in the vehicle up and down direction on the vehicle front side surface 94 of the front bumper absorber 90 as seen in a vehicle front view, so the area in which the back surface of the front bumper cover 12 and the raised portion 92 are in contact with or in close proximity to each other becomes wider. Consequently, when a load is applied by hand from the vehicle outer side to the front bumper cover 12 such as when washing the vehicle, this load can be received in a wide area via the front bumper absorber 90 by the front bumper reinforcement 16, so deformation of the front bumper cover 12 toward the vehicle rear side can be prevented. Because of this, good appearance of the front bumper cover 12 can be maintained.

Furthermore, the raised portion 92 is formed integrally with the front bumper absorber 90, so it is not necessary to prepare the raised portion 92 using a separate part. Furthermore, a post-processing step for disposing the raised portion 92 becomes unnecessary. Because of this, costs can be reduced and the aerodynamic performance of the vehicle 10 equipped with the grille shutter structure can be improved.

Furthermore, the raised portion 92 is disposed in such a way as to make a complete circuit around, in a substantially rectangular shape, the vehicle front side surface 94 of the front bumper absorber 90 as seen in a vehicle front view, so the raised portion 92 has two sections in contact with or in close proximity to the back surface of the front bumper cover 12 and disposed spaced apart from each other in the vehicle up and down direction. Consequently, the air (A) can be more reliably prevented from flowing out from between the front bumper cover 12 and the front bumper absorber 90. Because of this, a drop in the aerodynamic performance of the vehicle 10 can be further prevented.

It should be noted that although in the first embodiment, the upper side raised portion 50 is disposed extending along the vehicle upper side end portion 54 of the vehicle front side surface 47 of the front bumper absorber 14, the raised portion 50 is not limited to this and may also be disposed in another place, such as on the lower side end portion of the surface 47.

Embodiments of the present invention have been described above, but the present invention is not limited to what is described above and can of course be implemented in a variety of ways other than those described above without departing from the scope of the invention.

What is claimed is:

1. A bumper absorber structure for use with a vehicle, the bumper absorber structure comprising:
   a bumper reinforcement disposed at a front portion of the vehicle and that is formed in a long shape lengthwise direction of the vehicle and coincides with a vehicle width direction;
   a bumper cover that covers the bumper reinforcement from a vehicle front side and being equipped with an air intake opening that opens in a vehicle front and rear direction;
   an air introduction path disposed on a rear side in the vehicle front and rear direction of the bumper cover as seen in a vehicle side view, the air introduction path introducing air from the air intake opening toward a vehicle rear side;
   a grille shutter disposed at the air introduction path and on a rear side in the vehicle front and rear direction of the bumper reinforcement as seen in the vehicle side view, the grille shutter being configured to open and close the air introduction path; and
   a bumper absorber attached to a front side in the vehicle front and rear direction of the bumper reinforcement, the bumper absorber forming a part of the air introduction path together with the bumper reinforcement, the bumper absorber having a front side surface including a raised portion that projects toward a vehicle front side relative to the vehicle front side surface, the raised portion being in contact with or in close proximity to a back surface of the bumper cover while the front side surface is spaced apart from the bumper cover.

2. The bumper absorber structure according to claim 1, wherein a deformation absorption space that allows deformation of the bumper cover at the time of a vehicle crash is: (i) disposed between the bumper absorber and the bumper cover, and (ii) not disposed between the raised portion and the bumper cover.

3. The bumper absorber structure according to claim 1, wherein
   the raised portion includes a deformation receiving portion that is formed in a shape meandering in a vehicle up and down direction on the front side surface of the bumper absorber as seen in a vehicle front view, and
   the raised portion receives deformation of the bumper cover toward the vehicle rear side.

4. The bumper absorber structure according to claim 1, wherein the raised portion is formed integrally with the bumper absorber.

5. The bumper absorber structure according to claim 1, wherein
   the raised portion forms a complete circuit around the front side surface of the bumper absorber as seen in a vehicle front view, and
   the raised portion is formed in a substantially rectangular shape.

6. The bumper absorber structure according to claim 1, wherein the raised portion includes an upper side raised portion and lateral side raised portions.

* * * * *